United States Patent [19]

Keller

[11] 4,448,029
[45] May 15, 1984

[54] PROCESS FOR QUICK FREEZING AND CONDITIONING INDIVIDUAL PRODUCTS, AND APPARATUS FOR PRACTICING THIS PROCESS

[76] Inventor: Jean-Paul Keller, 15, rue des Remparts, Balgau (Haut-Rhin), France

[21] Appl. No.: 384,083

[22] Filed: Jun. 1, 1982

[30] Foreign Application Priority Data

May 29, 1981 [FR] France .................................. 81 10847
Apr. 23, 1982 [FR] France .................................. 82 07197

[51] Int. Cl.³ ............................................. F25D 13/06
[52] U.S. Cl. ........................................ 62/63; 62/374; 62/380; 62/384
[58] Field of Search .................... 62/63, 374, 380, 384

[56] References Cited

U.S. PATENT DOCUMENTS

| | | | |
|---|---|---|---|
| 3,708,995 | 1/1973 | Berg | 62/374 |
| 4,090,369 | 5/1978 | Le Diouron | 62/63 |
| 4,157,650 | 6/1979 | Guibert | 62/380 |
| 4,249,388 | 2/1981 | Burns | 62/374 |

FOREIGN PATENT DOCUMENTS

| | | |
|---|---|---|
| 1012509 | 7/1952 | France . |
| 1251915 | 12/1960 | France . |
| 1439553 | 4/1966 | France . |
| 2008243 | 1/1970 | France . |
| 2184405 | 12/1973 | France . |
| 2211633 | 7/1974 | France . |
| 2244973 | 4/1975 | France . |

*Primary Examiner*—Ronald C. Capossela
*Attorney, Agent, or Firm*—Young & Thompson

[57] ABSTRACT

Process for quick freezing and conditioning of individual products, and apparatus to practice this process. The process is characterized in that it consists essentially in treating small individual quantities of different products in modular indivdual quick-freeze chambers (1) fed with cryogenic gas and connected each to a quick-freeze tunnel (3) so as to provide in the latter a low temperature, and in treating larger quantities of product pieces in the tunnel (3), provided with a conveyor belt (4) and which is also fed with cryogenic gas, in evacuating the residual warmed gas obtained from the interior of the tunnel (3), in packaging the products leaving the tunnel in insulating packaging disposed in a receiver (6) mounted at the outlet of the tunnel (3), or in filling the packaging with products issuing from a chamber, then in surrounding the assembly of products disposed in the packaging with a cryogenic product, and closing the packaging.

13 Claims, 7 Drawing Figures

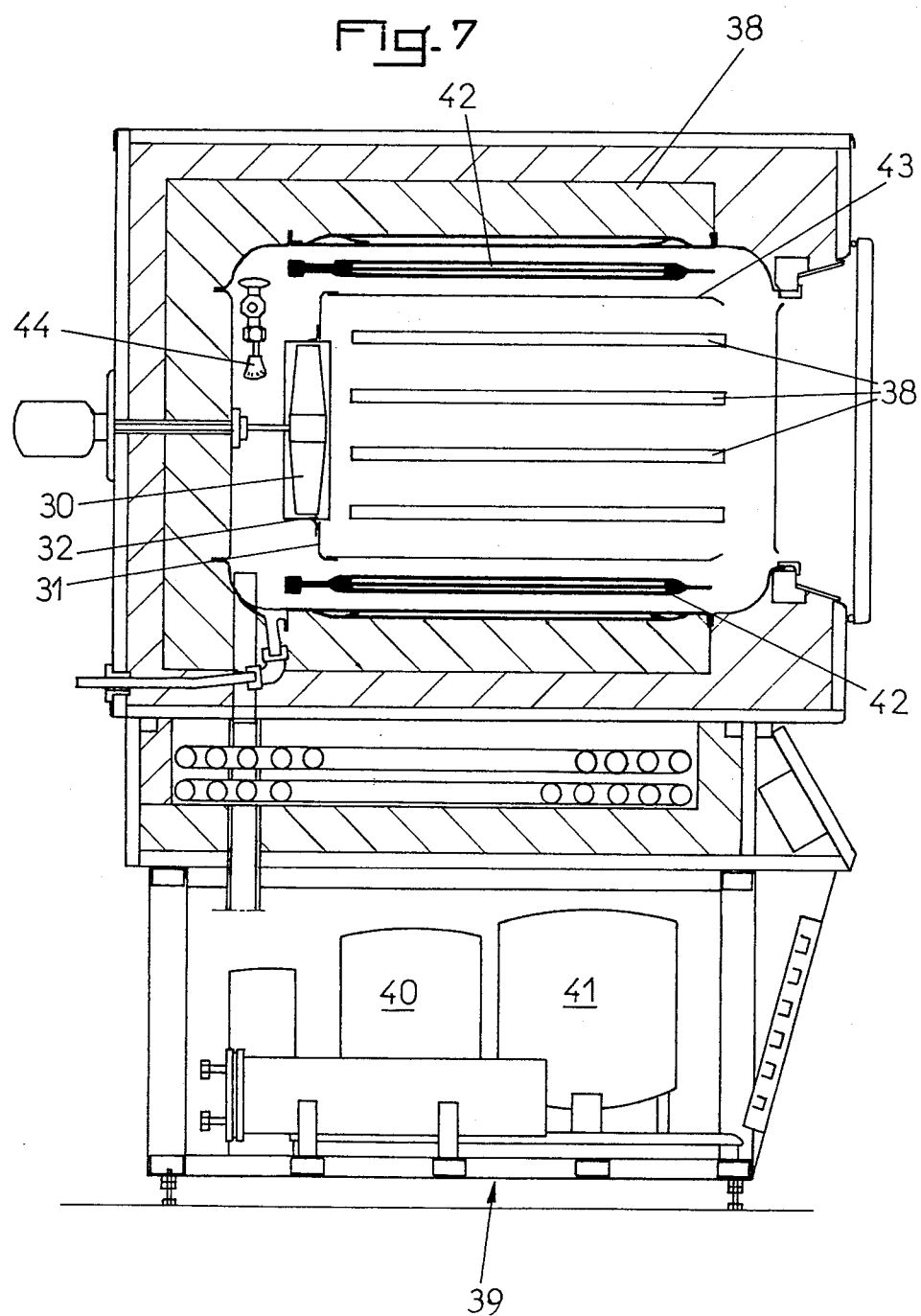

PROCESS FOR QUICK FREEZING AND CONDITIONING INDIVIDUAL PRODUCTS, AND APPARATUS FOR PRACTICING THIS PROCESS

The present invention relates to the field of the preparation of products by quick freezing with a view toward a long preservation, and has for its object a process for quick freezing and conditioning individual products.

The invention also has for its object apparatus for practicing this process.

At present, quick freezing of comestible products is generally effectuated on an industrial scale, either continuously by means of a tunnel through which the products are moved, or by batches of products in a chamber of large capacity.

These known processes of quick freezing permit industrial treatment continuously and with mass production of individual products in the case of tunnels, or of bulk products in the case of chambers.

However, the use of these tunnels or chambers is not adapted to handle smaller quantities, for example several kilograms of different products, for direct sale to individual consumers.

Moreover, a tunnel permits the quick freezing only of products of the same dimensions, and the use of chambers for the preparation of small individual quantities is not economically feasible.

The object of the present invention is to overcome these disadvantages.

Thus it has for its object a process for quick freezing and conditioning of individual products, characterized in that it consists essentially of treating small individual quantities of different products in modular individual quick-freezing chambers fed with a cryogenic gas and provided each with a quick-freeze tunnel so as to provide in the latter a low level of temperature, and in treating larger quantities of product pieces in the tunnel, provided with a conveyor belt, and which is also fed with a cryogenic gas, removing the residual warmed gas obtained from the interior of the tunnel, packaging the products leaving the tunnel in insulating packaging disposed in a receptacle mounted at the outlet of said tunnel, or in filling said packaging with the products from a chamber, then in surrounding the products within the packaging with a cryogenic product, and closing the packaging.

The invention also has as its object apparatus for practicing the process described above, characterized in that it consists essentially of a frame mounted on legs carrying modular individual quick-freeze chambers and an electronic control casing, by a quick-freeze tunnel disposed below the frame enclosed in its lower portion by a conveyor belt mounted on a movable gastight chamber, by a receptacle provided at the outlet of the tunnel, by a treatment station for packaging and for filling the latter with a cryogenic product, by circulation conduits for cryogenic gas between the chambers and the tunnel, by means for extracting and evacuating residual warmed gas from the tunnel, and by apparatus for evacuating residual gas from the treatment station.

According to a modification of the invention, the apparatus is constituted solely by modular chambers juxtaposed and/or superposed, at least one of these chambers, preferably the lower and/or central lower chamber, being connected by gas conduits to all the other chambers and providing a recovery enclosure for refrigeration, which is connected by other means to an evacuation conduit for the heated gases, and the conduit for feeding cryogenic gas to the assembly is connected to apparatus for the production of cryogenic product in the form of snow provided with a receptacle for receiving said product.

According to another characteristic of the invention, each chamber is provided with support plates for the product to be quick frozen, preferably provided with a coating of anti-stick material effective at very low temperature such as that commercially known as RILSAN, and in its forward portion, below each plate, at least one nozzle for injecting cryogenic gas in a flat wide stream, the refrigeration recovery chamber being also provided with such nozzles whose control is effectuated as a function of the temperature gradient attained in such chamber, and the cryogenic gas mixing fan is a centrifugal fan disposed at the rear of each chamber behind a plate provided with an opening in the form of a venturi and whose edges are slightly spaced from the internal walls of the chamber so as to promote mixing of the gas in said chamber and increasing the velocity of the gases to promote heat exchange.

According to a modification of the invention, the cold source is constituted by an installation for the mechanical production of cold connected in known manner to plate exchangers disposed in front of the horizontal and vertical longitudinal walls of the chambers, with spacing, and protected from the quick-freezing enclosure containing the support plates for the product by means of an internal circumferential wall connected to the rear plate provided with the venturi opening, so as to provide a passageway for air impelled by the centrifugal fan along the exchangers.

The invention will be better understood in connection with the following description, which relates to preferred embodiments, given by way of non-limiting example, and referring to the accompanying schematic drawings, in which:

FIG. 7 is a side elevational view in cross section of a modification of the invention.

Figure 1:
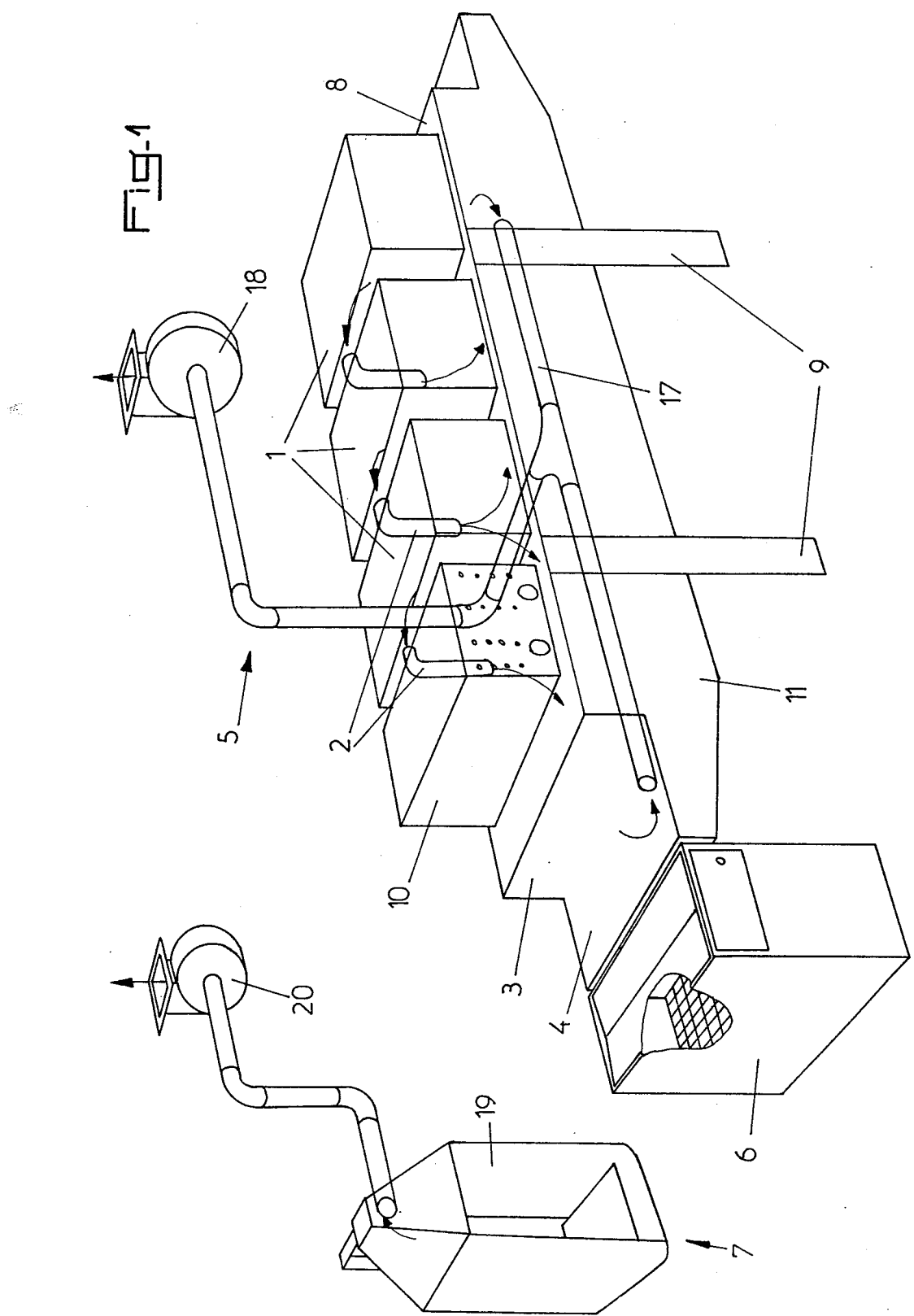
FIG. 1 is a schematic perspective view of apparatus according to the invention.
Figure 2:
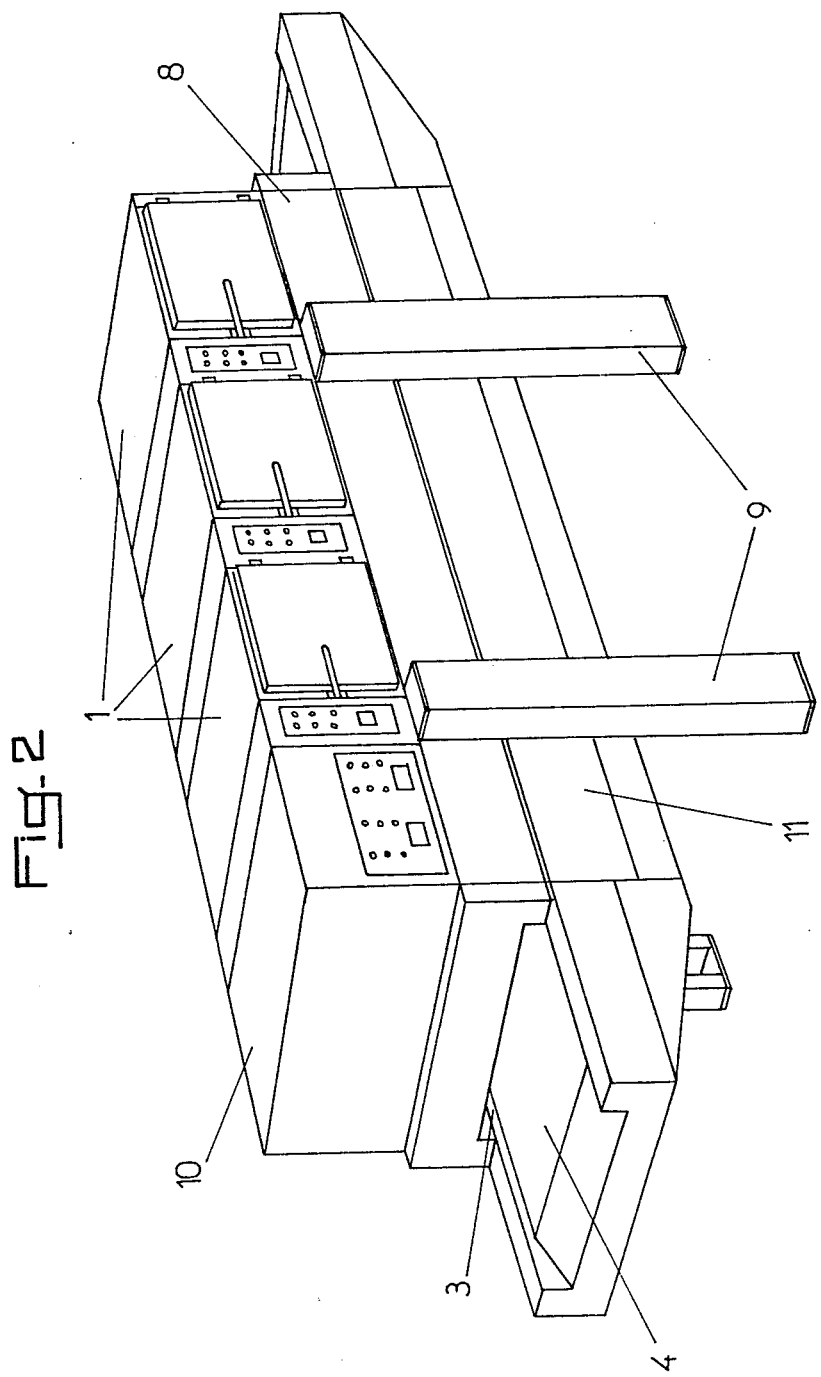
FIG. 2 is a perspective view of the apparatus without the receiver and the conditioning station.

According to the invention, and as shown more particularly by way of example in FIG. 1 of the accompanying drawings, the process for quick freezing and conditioning of individual products consists in treating small individual quantities of different products in modular individual quick-freeze chambers 1 fed with cryogenic gas by means of a conduit (not shown), and which are each connected by conduits 2 to a quick-freeze tunnel 3 so as to provide in the latter a low level of temperature, and in treating larger quantities of piece products in the tunnel 3, which is provided with a conveyor belt 4 (FIG. 2), and which is also directly fed with cryogenic gas, in evacuating the residual warmed gas obtained from the interior of tunnel 3 by means of an extraction and evacuation device 5, in packaging the products leaving tunnel 3 in insulating packaging disposed in a receiver 6 mounted at the outlet of said tunnel 3, or in filling said packaging with products issuing from a chamber, then in surrounding the assembly of products disposed in the packaging with a cryogenic product and closing the packaging at a station 7 for conditioning and filling the cryogenic product.

By feeding to the tunnel 3 residual gas issuing from chambers 1, the temperature level in said tunnel is maintained very low, while by virtue of this utilization, the consumption of cryogenic gas to attain quick-freezing temperature will be very small, at the same time that the operation will be performed more rapidly.

The individual modular chambers 1 are secured to a frame 8 supported on legs 9 and having, moreover, an electronic control box 10 for the chambers 1 and the tunnel 3. The latter is arranged below the frame 8 and is closed at its lower portion by conveyor belt 4 and at its ends by known gastight closures. The conveyor belt 4 is mounted on a gastight chamber 11 which may be vertically moved the length of legs 9 to apply the conveyor belt 4 in a gastight manner, by means of a double longitudinal joint, against the frame 8. The displacement of the caisson 11 is effected, in known manner, by means of jacks or the like, and to permit effective drying of the interior of tunnel 3 and of belt 4, the latter is maintained in an intermediate position in the open position of chamber 11 thanks to slidable support rods, and the actuating jacks of the chamber 11 may be individually controlled to permit tilting said chamber 11 to promote its drying.

The receiver 6 mounted in front of the outlet of the tunnel 3 and in front of the belt 4 is adapted for receiving insulating packaging to be filled with products leaving the tunnel 3.

The packaging filled with products is moved to conditioning station 7 where said products are surrounded with a layer of cryogenic product before the packaging is closed, so as to maintain continuous refrigeration during transportation.

The conveyor belt 4 is preferably constituted by stainless steel and moves on slideways of synthetic material secured to the frame of belt 4 in special guides permitting differential expansion between the steel and the synthetic material without hindrance and without deformation of the slides, and the drive motor of belt 4 is also mounted on the frame of the belt and drives the latter by means of sprockets, the tension of the belt and its differential elongation being compensated by an auxiliary device known per se.

The enclosure walls of the tunnel 3 as well as the walls of caisson 11 are preferably insulated by means of padding of expanded polyurethane foam.

Figure 3:
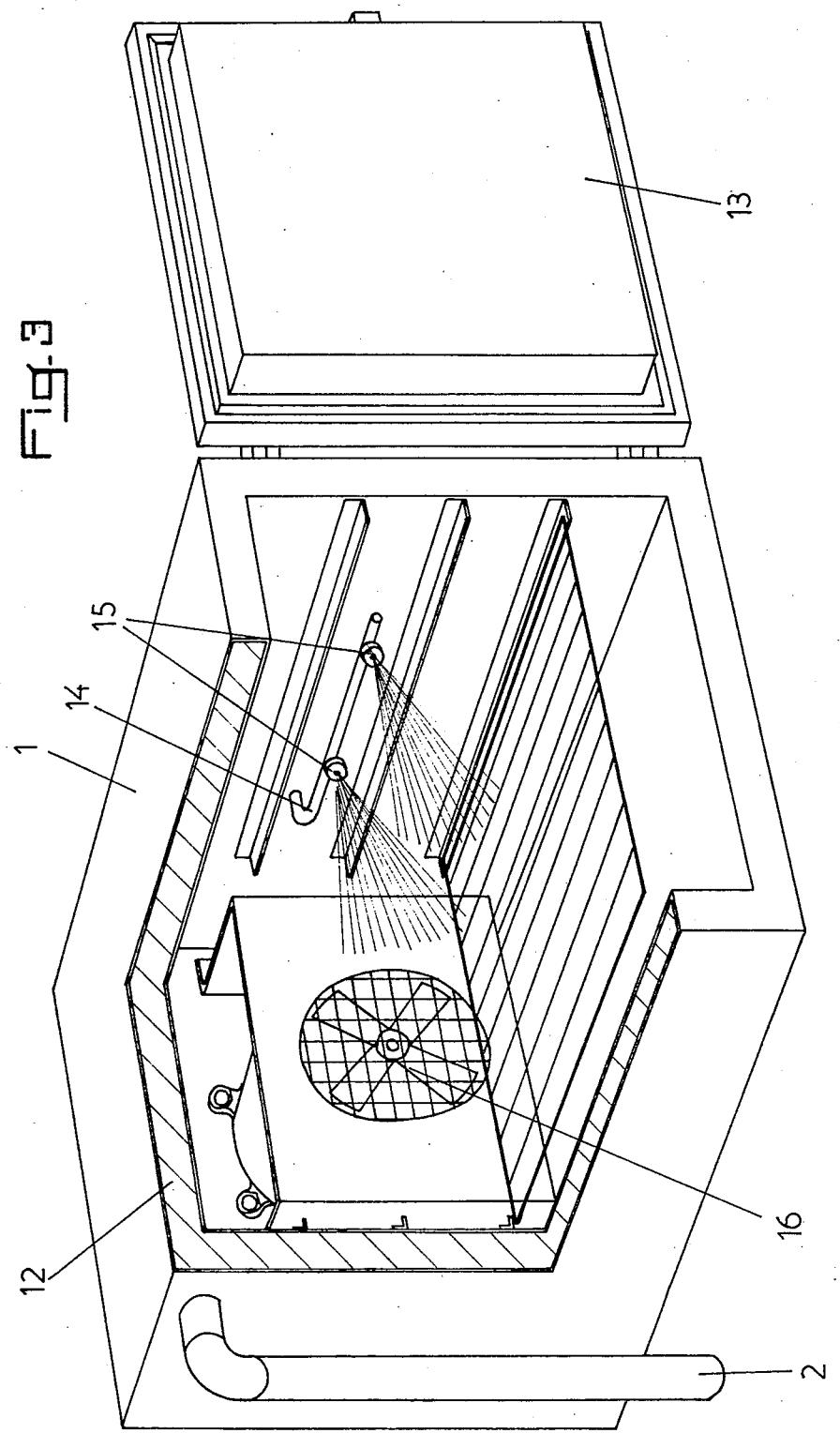
FIG. 3 is a perspective view, partially broken away, of an individual modular chamber.

FIG. 3 shows an individual modular chamber 1 whose walls are covered with a layer of expanded foam 12, and whose door 13 is also provided with an insulating material, and which is provided with a manifold 14 for injecting cryogenic gas comprising one or more elctromagnetic valves 15 for the automatic control of the quantity of gas to be injected, these valves being controlled by an electronic control device disposed in the electronic control box 10, and by a thermometric probe (not shown) disposed in chamber 1. In the interior of each chamber 1 is moreover provided an axial fan 16 adapted to impart turbulence to the gas so as to improve heat exchange between the products and the gas.

The injection of cryogenic gas in tunnel 3 is effected in the same manner as for chambers 1, and its turbulence is effectuated by several axial fans mounted in the upper wall of the tunnel, the temperature control being effectuated by two probes disposed adjacent the entrance and the exit of tunnel 3.

The device 5 for extraction and evacuation of residual warmed gas is constituted by a conduit 17 connected to the two ends of tunnel 3 and to a centrifugal exhaust fan 18 aspirating said gas and ejecting it to the atmosphere, this fan 18 having preferably two operating speeds for adaptation to the various possible gas flows, that is to say as a function of the loading of the device, the chambers 1 operating by themselves or together with tunnel 3.

The station 7 for conditioning and filling with cryogenic product is also provided with a gas evacuation device in the from of a hood 19 connected to a centrifugal exhaust fan 20.

The cryogenic gas that is used is preferably carbon dioxide, which has the property of subliming from a solid snow upon warming.

The electronic control box 10 includes all the control elements and is hermetically sealed, and all the operations of the device are indicated by luminous indicators, circuit breakers permitting disabling the device when needed. Moreover, box 10 includes shut off circuits preventing any diffusion of cryogenic gas in case of breakdown of fans 18 and 20 or opening tunnel 3 or a door of a chamber 1.

Finally, the duration of treatment in chambers 1 or the speed of movement of products in tunnel 3 is regulated by means of the control box 10.

Figure 4:
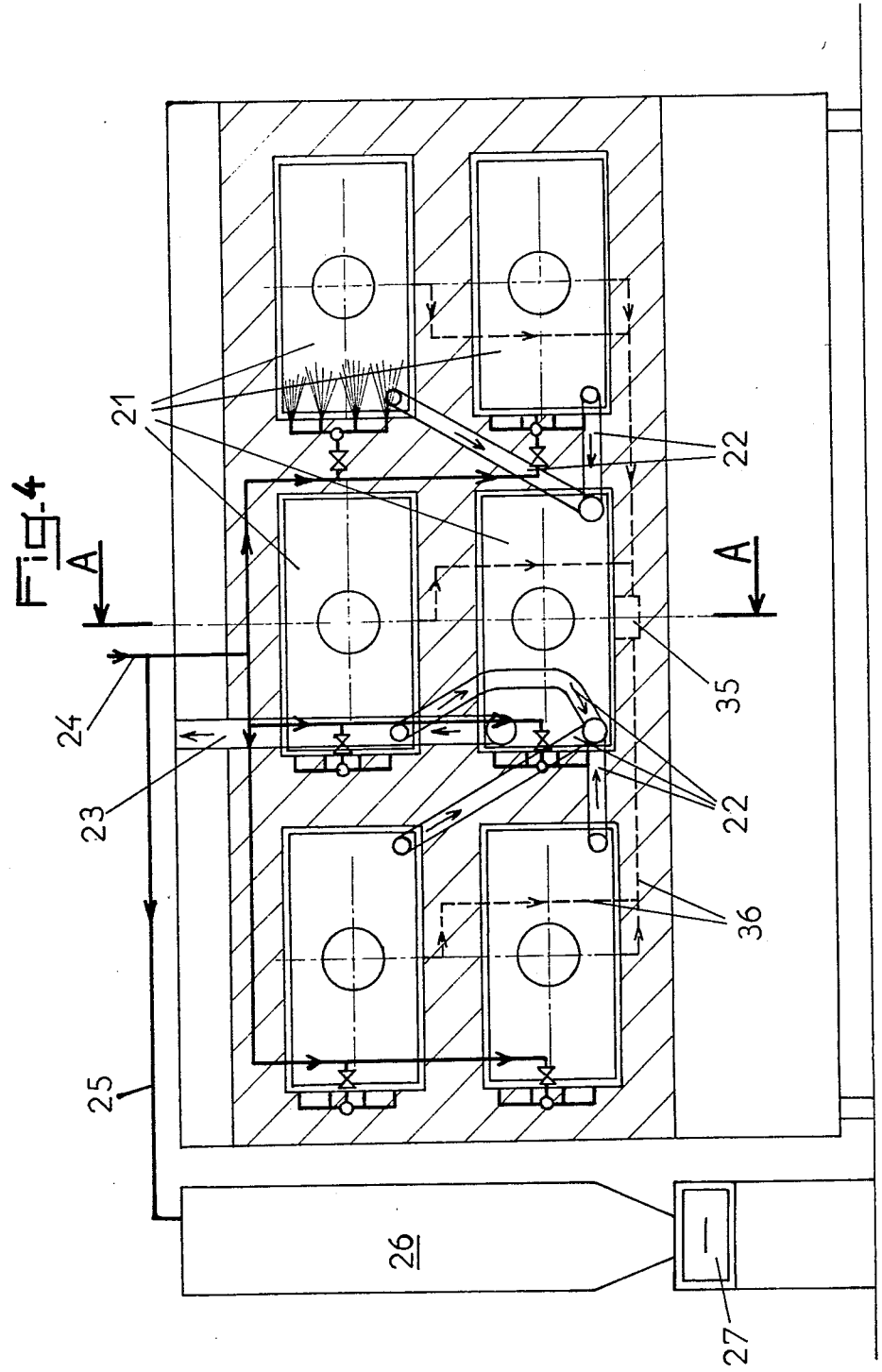
FIG. 4 is a front elevational view in cross section of apparatus according to the invention.
Figure 5:
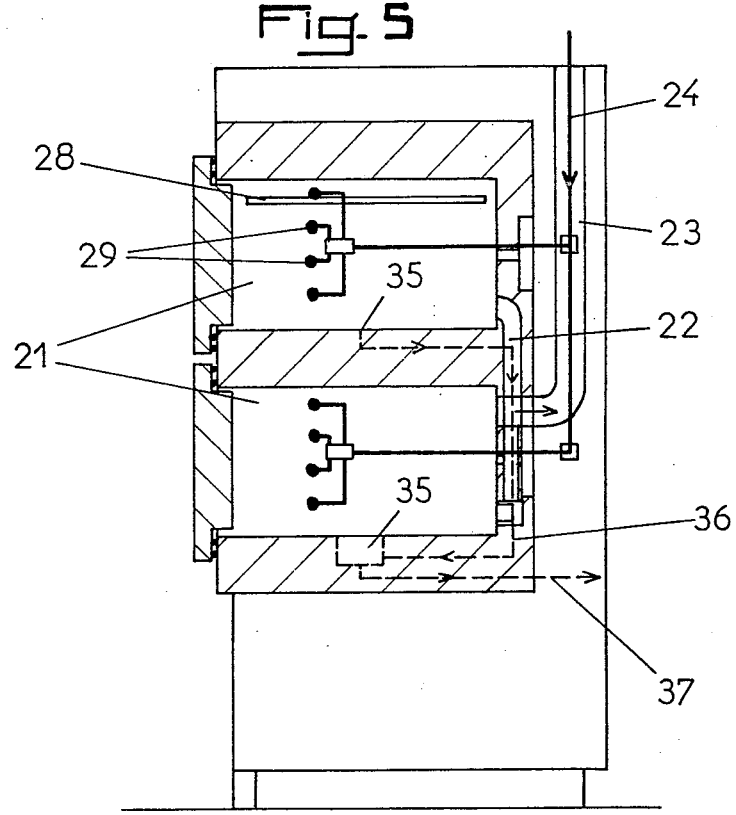
FIG. 5 is a cross-sectional view on the line A—A of FIG. 4.
Figure 6:
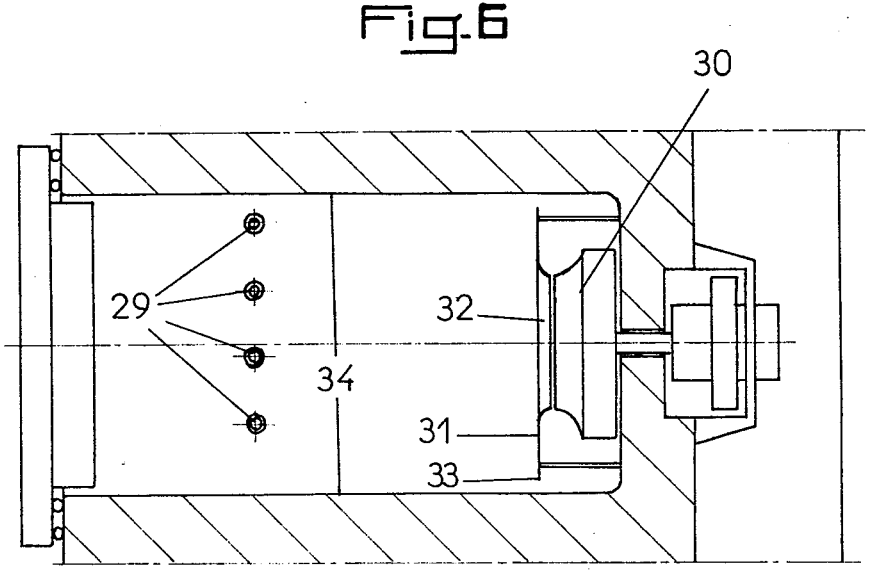
FIG. 6 is a longitudinal cross-sectional view, on a larger scale, of a modular chamber.

According to a modification of the invention, and as shown in FIGS. 4 to 6 of the accompanying drawings, the quick-freeze apparatus is solely constituted by juxtaposed and superposed modular chambers 21 of which the lower central chamber is connected by gas conduits 22 to the other chambers 21, and is adapted to recuperate the refrigeration of the latter. This recuperative chamber is, moreover, connected to an exhaust conduit 23 for warmed gases. The feed conduit 24 for cryogenic gas to the chambers 21 is preferably connected, by means of a branch conduit 25 to a device 26 for the production of cryogenic product in the form of snow provided with a receptacle 27 for receiving said product.

Each chamber is provided with support plates 28 for the products to be quick frozen, and an injection nozzle 29 for cryogenic gas in a wide flat stream is provided in the forward portion of the chamber above each plate 28. The cold recovery chamber is also provided with such nozzles 29 adapted to make up the necessary difference in refrigeration in the quick freeze process. The plates 28 are preferably provided each with a covering of non-stick material for very low temperature, such as, particularly, that known commerically as "RILSAN."

At the back of each chamber 21 is mounted a centrifugal fan 30 (FIG. 6) for agitating the cryogenic gas, disposed behind a plate 31 provided with an opening 32 in the form of a venturi, and whose edges 33 are slightly spaced from the internal walls 34 of chamber 21. Thanks to this construction, there is provided an effective agitation of the gas in chamber 21, whereby the speed of quick freezing is increased for a given quantity of injected gas.

According to another characteristic of the invention, each chamber 21 is provided with a command and control device (not shown) comprising thermometric probes, a thermostat for setting the treatment temperature, a device for controlling the sequence of injection of the cyrogenic gas, whose injection and shutoff cycles are presettable, whose operation is controlled by a thermometric probe, and whose actuation is controlled by a pushbutton that simultaneously actuates the fan 30 and of a timer for controlling the operation of the latter corresponding to the treatment time, the shutoff of the gas being controlled by another timer simultaneously actuated with the first and preset to ensure shutoff of gas injection while agitation of gas in the chamber is also ensured by the fan, whose control timer is set for excessive lapse of time, for example of several minutes. Thanks to this embodiment, it is possible better to use the energy of the cryogenic gas by circulating said gas, at the desired temperature, at the end of treatment, whereby a saving of gas is possible.

Moreover, to ensure complete quick freezing, no matter what the temperature outside the chamber, each chamber is provided with a thermometric control probe for its treated output (not shown) which operate control timers upon achieving a predetermined treatment outlet temperature.

So as to permit thorough elimination of water from washing and defrosting, each modular chamber 21 is provided at its lowest point with an outlet opening 35 connected to a flow conduit 36, the conduits 36 being preferably interconnected at the level of the refrigeration recovery chamber to flow into a common conduit 37.

To avoid loss of cryogenic gas upon opening the door of the recuperation chamber, the latter is provided with a contact actuating a cutoff device for the injection of gas into all the other chambers during said opening. Thus, it is possible to fill the recuperation chamber with products to be treated without risk of loss of gas, the treatment being conducted in the other chambers by agitating the gas therein until the closing of the recuperation chamber permits normal operation of the various treatment cycles.

FIG. 7 shows a possible modification of a modular chamber 38, in which the cold source is constituted by apparatus 39 for the mechanical production of cold, comprised by two compressors 40 and 41 mounted in cascade, which is connected in a manner known per se to plate exchangers 42, which are disposed in front of the horizontal and vertical longitudinal walls of chamber 38, spaced from these walls, and which are protected from the quick freeze enclosure surrounding the plates 28 by means of an internal circumferential wall 43. This latter is connected to the rear plate 31 provided with openings 32 in the form of a venturi communicating with fan 30, whereby there is provided a passageway for air propelled by the latter along the exchangers 42. Thus, the air circulated by fan 30 permits rapid cooling of the products to be quick frozen. This embodiment is particularly interesting for the quick freezing of large undivided pieces for which cryogenic quick freezing is relatively costly, while the production of mechanical refrigeration can as a practical matter be achieved in known manner with a very low temperature gradient. Moreover, to guarantee as needed a faster quick freezing of products of chamber 38, there may be provided, in addition to plate exchangers 42, a cryogenic gas injection nozzle 44 disposed behind fan 30. Thus, the gas injected by nozzle 44 is rapidly circulated by the fan 30, and the products to be treated, struck by the bitter cold existing in the chamber by virtue of the mechanical refrigeration produced, will undergo very rapid quick freezing.

According to another characteristic of the invention, not shown in the accompanying drawings, the quick freeze apparatus is advantageously constituted by at least one modular chamber fed with mechanical refrigeration in combination with an assembly of modular chambers fed with cryogenic gas of which at least one is adapted to the recovery of refrigeration and is also connected to a chamber with mechanical refrigeration.

Thanks to the invention, it is possible to provide quick freezing of different products precisely as needed, and to preserve completely the refrigeration with small expenditure of energy.

Of course, the invention is not limited to the embodiments described and illustrated in the accompanying drawings. Modifications are possible, particularly with respect to the constitution of the various elements, or by substitution of equivalents, without thus departing from the scope of the invention.

What is claimed in:

1. Process for quick freezing and conditioning of individual products, comprising treating small individual quantities of products in individual modular quick-freeze chambers (1) fed with cryogenic gas, treating larger quantities of piece products in a tunnel (3) provided with a conveyor belt (4), and which is also fed with cryogenic gas, evacuating cryogenic gas from the chambers (1) to the tunnel (3) to cool the tunnel, evacuating the residual warmed gas obtained from the interior of the tunnel (3), packaging the products leaving the tunnel in insulating packaging disposed in a receiver (6) mounted at the outlet of said tunnel (3), then surrounding the assembly of products disposed in the packaging with a cryogenic product, and closing the packaging.

2. A process as claimed in claim 1, in which said cryogenic product is carbon dioxide snow.

3. Apparatus for quick freezing individual products, comprising a frame (8) mounted on legs (9) carrying individual modular quick-freeze chambers (1) and an electronic control box (10), a quick-freeze tunnel (3) disposed beneath the frame (8) and closed at its lower part by a conveyor belt (4) mounted on a gastight mobile chamber (11), a receiver (6) disposed in front of the outlet of the tunnel (3), a conditioning station (7) for the packages and for filling the latter with a cryogenic product, circulation conduits (2) for conveying cryogenic gas from the chambers (1) to the tunnel (3), and a device (5) for extracting and exhausting residual warmed gas to outside the tunnel (3).

4. Apparatus, according to claim 3, characterized in that the tunnel (3) is closed at its lower portion by the conveyor belt (4) and at its ends by airtight barriers, the conveyor belt (4) being mounted on the gastight chamber (11), which may be moved vertically along the legs (9) to apply the conveyor belt (4) in a sealed manner, by means of a double longitudinal joint, against the frame (8), and the movement of the chamber (11) is effectuated by means of jacks, and to permit effective cleaning of the interior of the tunnel (3) and of the belt (4), the latter is maintained in an intermediate position in the open position of the chamber (11) by slidable support rods, and the activating jacks of the chamber (11) may be controlled in a differential manner to permit inclination of said chamber (11) to promote its cleaning.

5. Apparatus, according to claim 3, characterized in that the conveyor belt (4) is constituted of stainless steel and slides on slideways of synthetic material secured to the frame of the belt (4) in guides permitting differential expansion between steel and synthetic material without hindrance and without deformation of the slideways, and the drive motor of the belt (4) is also mounted on the chassis of the belt and drives the latter by means of chain wheels.

6. Apparatus, according to claim 5, characterized in that the enclosure walls of the tunnel (3) as well as the walls of the chamber (11) are insulated by means of a layer of expanded polyurethane foam.

7. Apparatus, according to claim 3, characterized in that each modular chamber (1) is provided with an injection manifold (14) for cryogenic gas comprising one or more electromagnetic valves (15) for automatic regulation of the quantity of gas to be injected, these valves being controlled by an electronic control device disposed in the electronic control box (10), and by a thermometric probe disposed in the chamber (1) and in the interior of each chamber (1) is, moreover, provided an axial fan (16) adapted to place the gas in turbulence so as to improve heat exchange between the products and the gas.

8. Apparatus, according to claim 3, characterized in that the injection of cryogenic gas in the tunnel (3) is carried out in the same way as for the chambers (1), and its turbulence is effected by several axial fans mounted in the upper wall of the tunnel, the control of the temperature being effectuated by two probes disposed adjacent the inlet and the outlet of the tunnel (3).

9. Apparatus, according to claim 3, characterized in that the device (5) for extracting and exhausting residual warmed gas is constituted by a conduit (17) connected to the two ends of the tunnel (3) and to a centrifugal exhaust fan (18) drawing said gas and ejecting it to the ambient atmosphere, this fan (18) having two operating speeds for adaptation to various possible gas flows as a function of the loading of the apparatus, the chambers (1) operating singly or together with the tunnel (3).

10. Apparatus, according to claim 3, characterized in that the station (7) for conditioning and filling with cryogenic product is provided with a gas exhaust device in the form of collection means (19) connected to a centrifugal exhaust fan (20).

11. Apparatus, according to claim 3, characterized in that the cryogenic gas used is solid carbon dioxide.

12. Apparatus, according to claim 3, characterized in that the electronic control box (10) encloses all the control elements and is hermetically sealed, and all the functions of the device are indicated by means of illuminated indicia, safety shutoffs permitting the disabling of the apparatus when needed, and moreover, the box (10) encloses shutoff circuits preventing any diffusion of cryogenic gas in case of breakdown of the fans (18) and (20) or opening of the tunnel (3) or of a door of the chamber (1).

13. Apparatus, according to claim 3, characterized in that the duration of treatment in chambers (1) or the speed of movement of the products in the tunnel (3) is controlled by means of the control box (10).

* * * * *